United States Patent [19]
Meier et al.

[11] 4,085,403
[45] Apr. 18, 1978

[54] COMBINED ON-BOARD REMOTE CONTROL ENERGY SUPPLY DISTRIBUTION AND SIGNALING SYSTEM, PARTICULARLY FOR AUTOMOTIVE VEHICLES

[75] Inventors: Werner Meier; Walter Hofer, both of Schwabach; Georg Haubner, Berg; Albert Weckenmann, Oberasbach, all of Germany

[73] Assignee: Robert Bosch GmbH, Stuttgart, Germany

[21] Appl. No.: 648,783

[22] Filed: Jan. 13, 1976

[30] Foreign Application Priority Data

Jan. 30, 1975 Germany .............................. 2503679

[51] Int. Cl.² ............................................. H04Q 11/04
[52] U.S. Cl. ................................ 340/168 R; 307/10 R; 340/147 SY; 340/163
[58] Field of Search ............... 340/147 C, 163, 168 R, 340/167 R, 147 SY; 307/10 R

[56] References Cited

U.S. PATENT DOCUMENTS

| | | | |
|---|---|---|---|
| 3,544,803 | 4/1968 | Taylor | 307/10 R |
| 3,634,826 | 1/1972 | Biedermann | 340/167 R |
| 3,648,057 | 3/1972 | Sognefest et al. | 307/10 R |
| 3,701,101 | 10/1972 | Heiz | 340/163 |
| 3,803,974 | 4/1974 | Everest et al. | 340/163 |
| 3,943,489 | 3/1976 | Brewster et al. | 340/147 SY |
| 3,952,286 | 4/1976 | Wakamatsu et al. | 340/163 |
| 3,965,366 | 6/1976 | Sumida et al. | 307/10 R |

*Primary Examiner*—Donald J. Yusko
*Attorney, Agent, or Firm*—Flynn & Frishauf

[57] ABSTRACT

A central station generates grouped clock pulses in recurring selection cycles, separated from each other by an extended control pulse (or pulse gap); particular loads are associated with particular counts of a central counter in the central station. The separate counts of the counters are connectable to a control bus of a combined power bus, clock bus and control bus cable system which passes by all the loads associated with the power supply. At the loads, receiving counter step in synchronism with the pulses occurring during the selection cycle. Specific loads are assigned specific count numbers and when coincidence between the count, as stepped by the counter and a pulse on the control bus, (as controlled by a switch setting at the central station) occurs, switching function, such as connection, or disconnection is effected at the load. An additional answer back line may be included in the cabling system, likewise connected upon stepping of the counter and recognition of the specific count associated with any receiver, connecting the receiving reply signal generator for example a sensor or transducer to an indicator at the central station, specific indicators being associated with specific switches at the central station.

26 Claims, 6 Drawing Figures

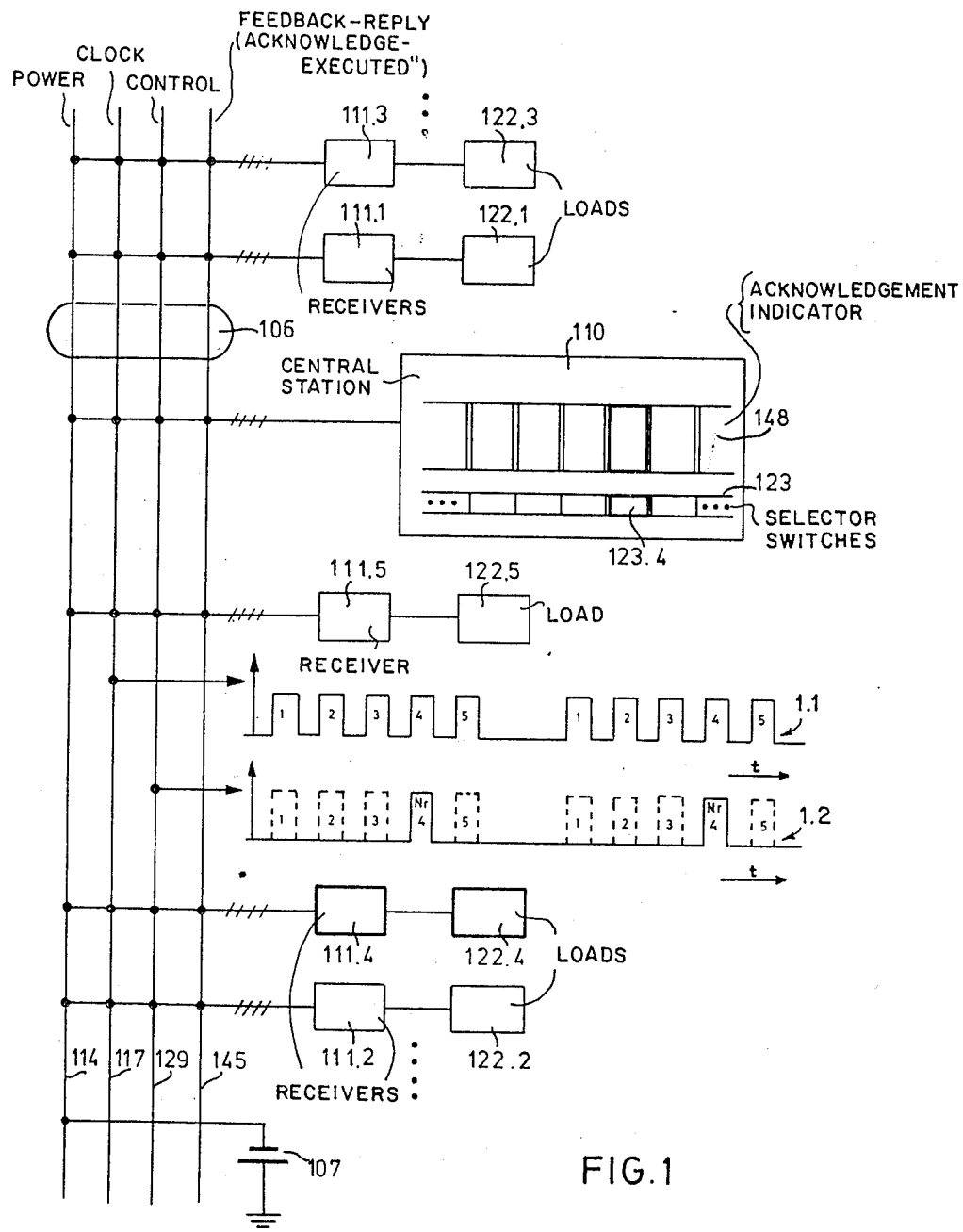

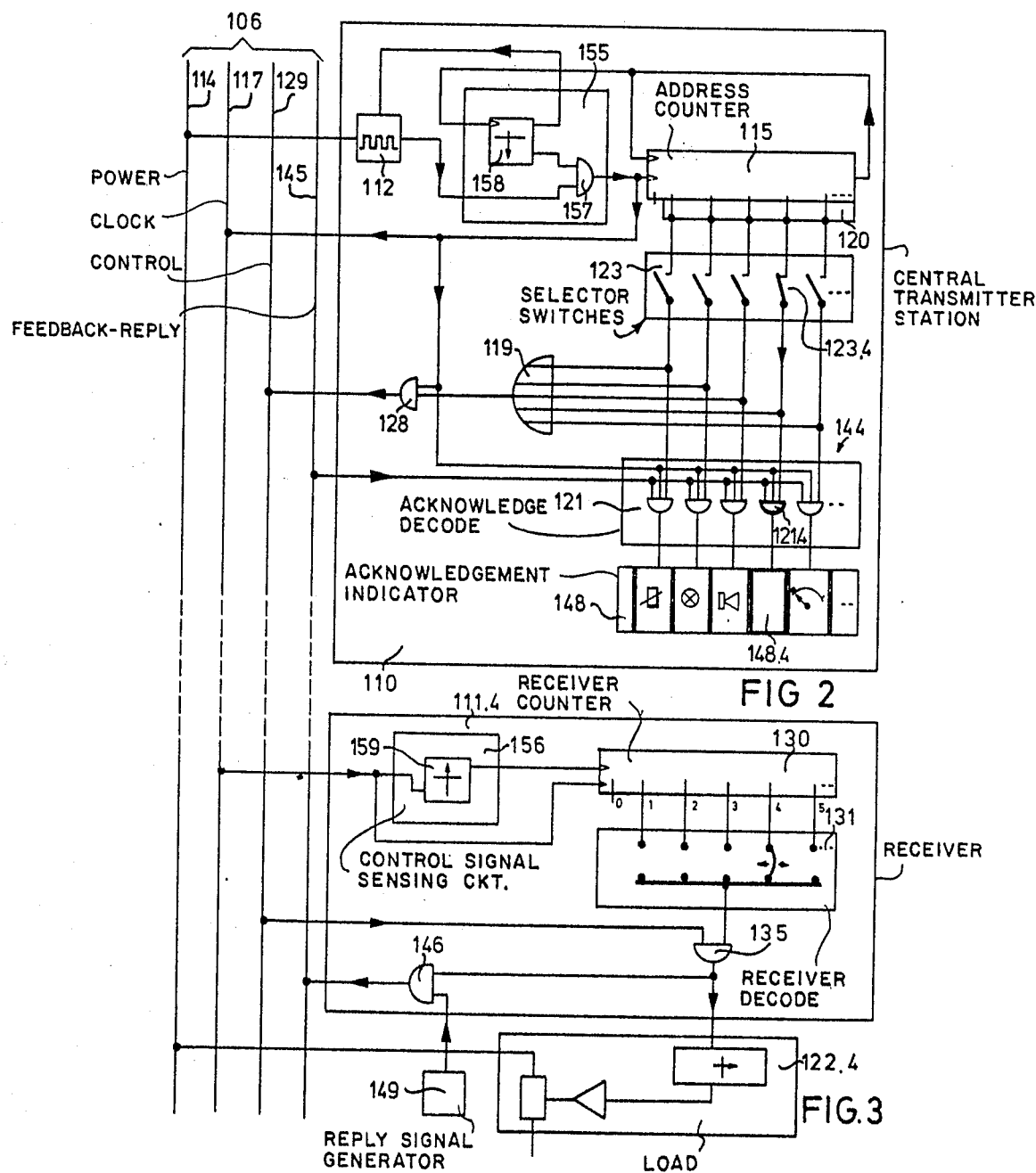

CONTROL SWITCHING SYSTEM FOR
FOR CENTRAL TRANSMITTING STATION

COMBINED ON-BOARD REMOTE CONTROL ENERGY SUPPLY DISTRIBUTION AND SIGNALING SYSTEM, PARTICULARLY FOR AUTOMOTIVE VEHICLES

The present invention relates to a remote load switching control system and more particularly to a system to control selective switching of loads connected to self-contained power supply systems, such as selective switching of loads connected to the electrical system of vehicles, typically automotive vehicles. Remote control switching systems are generally used in the instrumentation and control field, and have been referred to as combined bus systems, or party line systems (see, for example, "ELEKTRONIK" 1972, p. 331 et seq; 1973, p. 300; 1974, p. 289 et seq. and 345 et seq). Systems of this kind have the common feature that a bus system has receivers of loads connected thereto and which are selectively connectable under control of a central transmitter operating in a multiplex mode. This system permits reduction in the wiring and cabling requirements from the central station to the loads, so that the multi-wire cables to the individual receiver can be avoided, while still permitting unambiguous allocation of predetermined data to a specific receiver without loss of the data.

The particular type and mode of addressing of a specific receiver by the central station or central transmitter, as well as the construction and arrangement of the central station and of the receivers which cooperate in the network are highly dependent on the specific application. A particular sequence of operations in multiplex operation of such a party line system, designed for particular application, can be transferred to or applied with different applications only very rarely without basic intervention in the operating mode thereof.

The circuits illustrated in the articles in the aforementioned journal "ELEKTRONIK" are not generally applicable for a remote control system which can be used in the specific application of a motor vehicle to meet its requirements. A remote control system useful for and applicable in an automotive vehicle may not, for example, block other possible operating functions after any one operating function has been commanded (compare, for example, "ELEKTRONIK" 1974, p. 289 et seq. and p. 345 et seq.). A remote control system useful in automotive vehicles and using a common bus or a ring network must be capable of addressing selected loads and, if desired, additionally supervise the operation thereof without merely interrogating digitally available measuring results (see, for example, "ELEKTRONIK" 1972, pages 331 et seq.). An additional requirement for such systems is that the costs of the electronics involved necessary for multiplex operation in a common bus or ring bus system should not be greater than the savings which arise in cable and wire material costs, as well as the labor necessary to make, place, and connect multiple wire cables and cable harnesses.

Automotive vehicle accessories, which include automotive electrical components should be articles which can readily be standardized so that they are available in large quantities, made in mass production, and capable of versatile application of their basic functions. The basic functions should, therefore, be so arranged that a minimum number of inexpensively made standard modules permit construction of a remote control unit for the operation of loads connected in an automotive vehicle; the basic structure should be so arranged that, depending on the requirements of specific applications, it can readily be expanded without interference with the basic operating function thereof.

German Disclosure Document DT-OS 2,350,891 corresponding to U.S. patent application Ser. No. 299,954, now U.S. Pat. No. 3,814,861 illustrates a party line system which is designed for the specific requirements of automotive technology. This system has various disadvantages, one of which is that in any one selection cycle only a single control switch can be operated; the switches, separately, control respective loads of a multiplicity of loads connected in the system. An additional, special priority circuit is arranged for loads of particular importance. The operating cycles correspond to counting cycles. Another disadvantage is the requirement of a large number of clock and control lines to permit decoding at the receivers. Some of those lines pass, without interruption, from the central station by all the loads which are present; others of those lines, however, must be connected into the respective loads. Changes of the number of loads connected to the bus system, or re-arrangement in different spatial locations of the loads requires severing, splicing or joining of connecting lines, that is, intervention in the wiring system itself. This interferes with reliability of operation and easily results in connection errors.

It is an object of the present invention to provide a remote control system, and more particularly a remote load switching control system which is suitable for on-board installation of automotive vehicles, and which has as few separate wire lines as possible, in a bus system, which may be a ring bus system, and which still permits a large number, practically unlimited, of loads to be connected thereto without increasing the expenses and requirements for individual control thereof. It should also be possible to connect the loads in random arrangement without interruption of the bus system at any one connection point. The coding of the addresses of the respective loads should be so arranged that no noticeable time delay arises between operation of a control element assigned to a specific load and the response thereof, while ensuring that the selected load, and only the selected load, will respond reliably. The remote control system furthermore should be constructed by using a comparatively low number of different, but standardized circuit elements which can be connected, where desired, and which are versatile, and which can readily be modified by additional circuit components or networks, or can easily be replaced therewith. The system should be economical in installation and use and permit replacement of the presently customary vehicular electric networks within the price range thereof. Further, the system should permit various degrees of arrangement, depending on the desires of the user so that it can readily be later expanded without interference with the basic operation, and features thereof.

The system generally relates to selective control of loads; the term "load" as used herein refers to the customarily understood electrical loads, such as lights, motors, communication equipment and the like, as well as other operating elements in their most general sense; the term "load" therefore, within the scope of the present invention, also includes any type of component which can be connected to an electrical line, such as transducers, sensors, remote indicators, and the like.

SUBJECT MATTER OF THE PRESENT INVENTION

Briefly, a central station transmits clock pulses over a clock line, to which receivers, associated with the respective loads, are connected. The clock pulses are arranged in count groups, with a control signal between the last clock pulses of a count group or count cycle and the first clock pulse of the following count group or count cycle. This control pulse may, for example, be a pulse gap in the normal clock rate of the count pulses. An additional control circuit or control bus is provided which carries switching pulses occurring, preferably synchronously with the clock pulses, at predetermined count positions, depending on the operation of selected operating switches. The receivers include a decoding counter connected to the clock pulse, and a further connection connected to the control line or control bus which is programmed to recognize a predetermined count position of the counter; upon coincidence of a pulse being applied at the control bus at a predetermined count state, and the programming of the count position at the receiver, the specific load intended to be switched is activated e.g. by connection to a power bus.

The connecting lines or the bus system of the control system of the present invention requires, basically, only three wires: a main power supply, a single clock line, and a single control line. The central transmitter or central control unit, as well as all the receivers are connected in parallel to these lines or buses, in any desired arrangement. Additional loads and load receivers can be connected to the bus system as desired. This is in contrast to the previously known and proposed supply system which uses a multiplicity of control lines. The coding of the receivers can be arranged in any desired density since it is no longer necessary to utilize a time duration or time window sensed under analog conditions, for coincidence of response to provide for selective response of the loads. Rather, a common clock pulse is connected to all the receivers. This common clock pulse is generated in the central transmitter which also controls the counter circuit which is connected to the encoding circuit with which the various manually controllable operating switches are associated. The receivers also have counters which count, at the identical clock rate, in identical manner to the counter in the central station or central transmitter, identical counting cycles during any one selection cycle. Each load has a particular count state associated therewith, which is programmed into an interrogation stage associated with the receiver and connected to the receiver counter. The particular count stage of the receiver counter of the receiver is interrogated. Only if this particular count stage has a pulse applied over the control line when the counter reaches that count stage, coincidence will be indicated and a coincidence stage connected to the interrogation stage will be opened, or activated. This activation, then, occurs when the count state is reached during any counting cycle which corresponds to the particular selected load, thus controlling e.g. connection of the particular selected load. The control pulses which separate successive count cycles simultaneously effect synchronization of the entire system at relatively short intervals, so that any synchronization errors which might arise will not become cumulative.

In accordance with a feature of the invention, the system can easily be expanded by including a single feedback line indicating that commanded actions have been executed; such a feedback line may also be termed an acknowledge-executed bus. Only a single physical wire line is necessary. The respective receivers which provide for acknowledgment of a command supplied by the remote control system can be so arranged that the interrogation stage, decoding the command signals, can likewise be used to encode the feedback acknowledgment information. The central station can be easily arranged to allocate the return information to predetermined measuring or indicator instruments, such as indicator lights, by utilizing the encoding commanded by the specific operated switch, associated with the receiver, the response of which has been commanded.

The invention will be described by way of example with reference to the accompanying drawings, wherein:

FIG. 1 is a highly schematic general block diagram of a remote control system in accordance with the invention, showing a central station and five selectively connectable loads, their receivers, as well as pulse diagrams in connection with the explanation of the operation of the invention, arranged for selection of the fourth one of the particular load in a selection cycle;

FIG. 2 is a schematic block circuit diagram of the central transmitter station in accordance with FIG. 1;

FIG. 3 is a schematic block diagram of a preferred embodiment of a receiver and providing for acknowledgment of execution of a command, and wherein FIGS. 2 and 3 are connected by the broken lines indicative of the connection buses;

Figure 4:
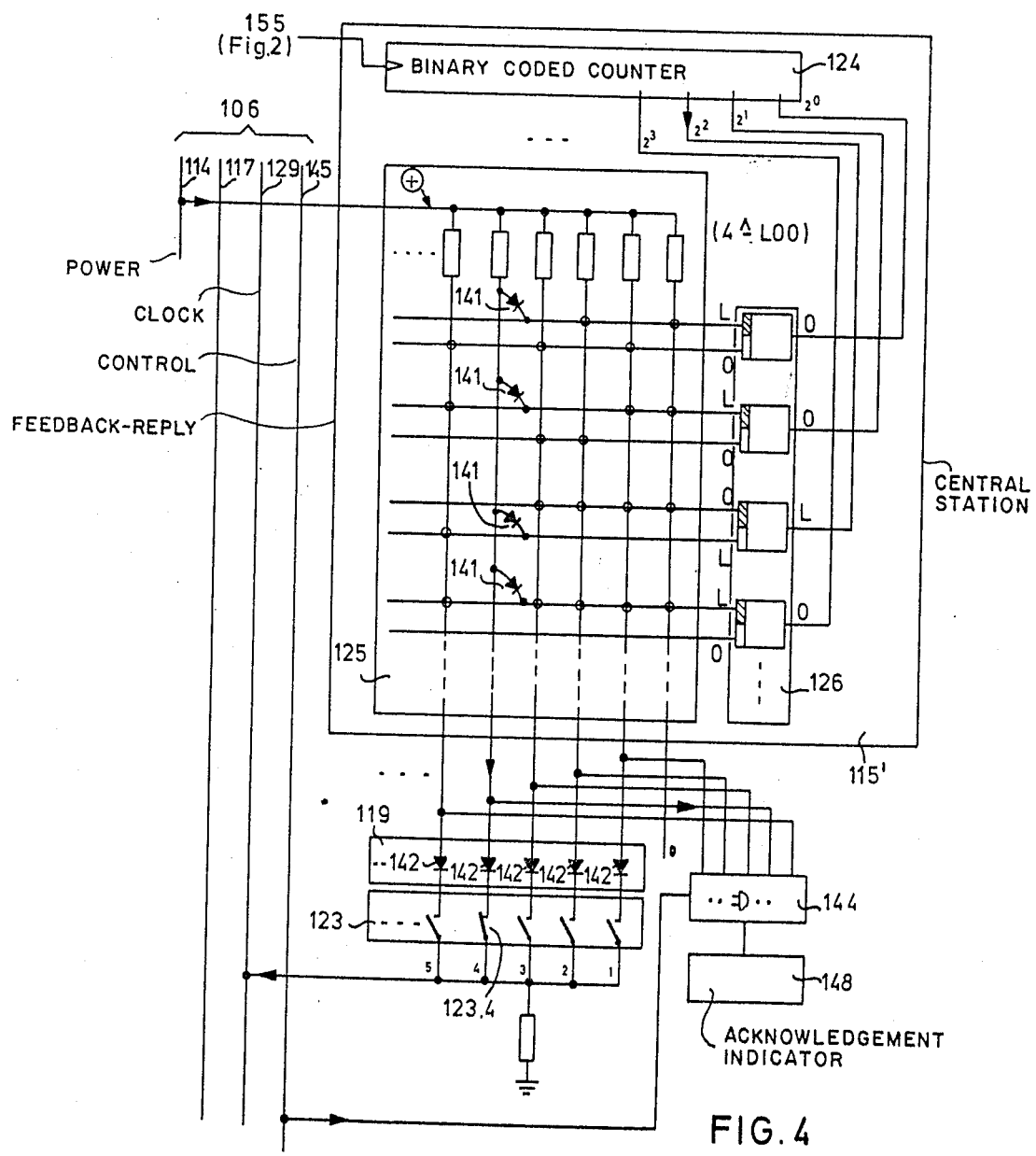
FIG. 4 is a schematic diagram of a central station particularly suitable for a large number of selectively connectable loads.

A central bus system 106 (FIG. 1), which may be an open-ended line system, or a ring connection, has four physical wire lines (and one return, which may, for example, be ground or chassis of an automotive vehicle). The four lines are a power bus 114, of sufficient current-carrying capacity to safely carry current to all loads which can be expected to be connected at any time; a clock bus 117; a control bus 129; and a replyback bus 145, carrying receipt or acknowledgment information that a command, transmitted over the control bus 129 has been executed. The power bus 114 is supplied from a power source 107, for example the battery of an automotive vehicle, connected for example over a voltage-stabilizing circuit (not shown). The bus system 106, consisting of the four cables, is run through the entire vehicle in which the remote control system is used and connects a central transmitter station 110 with all receivers 111. When applied to an automotive vehicle, the command switches 123 are preferably located in the vicinity of the steering wheel of the vehicle. The command switches 123 are connected to the central transmitter station 110. The electrical loads include, within the scope of the term, also transducers, check or measuring or instrumention elements, servo elements or the like. The receivers can be connected to the bus system 106 at any selected position. In the drawings, the decimal indication after the reference numeral 111, 122, for example, is indicative of the specific numbering of the specific elements; thus, switch 123.4 is the command switch No. 4 of the switch group 123.

The present way of providing selectively energized power connections to various loads in automotive vehicles can be reduced, by the present invention, to merely place the four-wire cable of the bus system 106 in the vehicle positioned where the loads are to be placed. The cable of the bus system 106, preferably, is a multi-conductor flat cable, for example as made by the 3M Company under the trademark "Scotchflex" ®. The central station 110 and the various receivers 111, to which the loads 122 are connected, are easily connectable to such a flat distribution cable by flat cable connectors, likewise supplied by the 3M Company. These connectors can be applied at random positions to the flat cable and effect electrical conductive connection between the connecting cables and the conductors of the flat main bus. The commercial flat-cable bus systems as presently made, have wire conductors of the same cross section. The power bus 114 requires substantially greater cross-sectional area than the other bus wires which only have to carry timing, control and measuring signals. The actual cable to be used may therefore utilize a cable having more than four parallel conductors, in which a plurality of conductors are electrically connected in parallel to form, jointly, the power supply bus 114. To supply loads having substantial power requirements, it will be desirable, in actual practice, to locate a separate supply power cable adjacent the flat cable to supply the required power, without undue heating and voltage drop. This additional power bus has been omitted from the drawing for simplicity.

The central station 110 applies a series of clock pulses to the clock bus 117. The clock pulses recur in cyclical groups, or cycles, separated from each other by a control signal, preferably a control pulse. Diagram 1.1 (FIG. 1) illustrates two clock pulse cycles, in which the control pulse is a pause, or a series of pulse gaps, having a length which is a plurality of individual clock pulses. The generation and use of the signals being applied to the clock bus 117 will be discussed in detail below.

The control bus 129 is energized by a signal only if at least one of the load receivers 111 is commanded to respond, in order to control operation of a connected load 122, under command selection by the central station 110. In the discussion that follows, and as also shown on the drawings, it will be assumed that the fourth load 122.4 is commanded to be connected to the power bus 114; to command this selection, the fourth operating switch 123.4 of the central station 110 is operated. All the other loads 122, that is 122.1, 122.2, 122.3, 122.5 are not commanded to respond. The control bus 129 thus will have a switching pulse applied thereto which is characteristic only of operation of the fourth operating switch 123.4, as illustrated in the diagram 1.2 of FIG. 1. Generation and operation upon sensing of such a pulse on bus 129 will be discussed below.

The replyback or "acknowledge-executed" bus 145 is only needed if the remote control system is so arranged that information is to be transferred back regarding execution of the command, or operating readiness by any one of the loads 122, under control of the central station 110. The preferred embodiment also permits interrogation by the central station 110 of measuring or supervisory apparatus by the central station 110. The data being fed back from the selected apparatus, that is, generically the "load" to the central station 110 are displayed on a replyback indicator 148, forming part of the central station 110.

A first embodiment of a preferred example of the central station 110 is illustrated in FIG. 2. A clock pulse generator 112 which, for example, is a free-running astable multivibrator, is connected to the power bus 114 of the bus system 106. All elements and components of the system are connected to this power bus to receive power therefrom. Sequences of pulses derived from the pulse generator 112 are connected to a counter circuit 115 which is used to address loads 122, and can thus be termed an address counter. The address counter circuit, besides the zero position, has as many count positions or stages as the maximum number of receivers 111 and loads 122 which can be controlled or addressed from the central transmitter 110 over the connecting bus system 106. One counting cycle, during which the counter 115 counts through all its stages, or is reset into its starting position, will be termed a selection cycle. During any one such selection cycle, any one of the loads 122 (FIG. 1) can be addressed over the control bus 129. The repetition rate of addressing any one of the loads, that is, effectively the length of the selection cycle, can be suitably chosen by controlling the clock rate of the clock generator 112; the length of the selection cycle can be made so short by increasing the clock frequency of the clock generator 112 that, in practical application, the time difference between manual operation of the various selector switches 123 and the corresponding response of the associated load 122 cannot be noticed, even if a high number of discrete count states must be counted by the counter 115, sequentially, in order to permit control of a large number of selectively connectable loads 122. FIG. 1 (and the subsequent figures) shows only five operating switches 123, for five separate loads for simplicity only; the selection cycle has at least six count states under such conditions. The sequence of clock pulses 112 is applied to the clock bus 117. The control signal or pulse, which separates the selection cycles of the clock pulses, is also applied to the clock pulse bus 117 in the form of an interruption of the regular recurrence rate of the clock pulses. To provide both the clock pulses as well as the control pulse to the bus 117, a control pulse generator 155 is provided which is connected to the astable multivibrator 112 and is changed to SET position by the reset pulse of the counter 115, which also resets the counter to zero state. The counter is activated only after the control pulse has been generated, to permit further counting thereof, that is, the counter is activated only after a control signal or pulse has separated a preceding counting cycle from the subsequent counting cycle.

The control signal or pulse can be generated in various ways. The control pulse can, for example, be a pulse applied to the bus 117 having different amplitude than the count pulses. Amplitude discrimination is, however, subject to ambiguity and noise; a better distinction is discrimination by polarity; thus, two count cycles can be separated by control pulses of different polarities. In a preferred form, however, the control pulse has the same polarity as the counting pulses but has a different length. The control pulse generator 155, therefore, is a pulse extension stage, which is energized, or started by the reset pulse of the counter 115 and forces a pause in pulses due to short-time blocking of the output from the astable multivibrator 112. The blocking period has a duration corresponding to the time elapsing during a plurality of count pulses generated by the generator 112, as indicated in FIG. 1, graph 1.1. The advantage of an extended control pulse, having a predetermined time length and occurring between well-defined sequences of count pulses, with respect to amplitude discrimination, has the advantage of essential immunity against noise pulses, and, with respect to polarity discrimination, has the advantage of simplicity in generation and in detection, since the system will operate with unipolar signals throughout. A pause in pulses is especially easy to generate, since simple circuit components can be used. In the preferred embodiment, as shown in FIG. 2, an AND-gate 157 and a monostable flip-flop (FF) 158 together form the logic and timing circuit which determines the pause defining the control pulse. As illustrated in FIG. 2, in a preferred form the pulse generator 112 is blocked during the pause, that is, in general, during the control pulse, and is newly triggered when the control pulse terminates. Thus, the count during the count cycles will be not be degraded due to the presence of partial count pulses, not having their normal duration and wave form.

The counter 115 may be a simple shift register, that is, a counter in which the last stage has a feedback line to the first stage if the number of loads 122 and the number of control switches 123 at the central station 110 is comparatively low. The output at the last stage of the shift register will then correspond to the carry or reset pulse of the counter 115. Further, the feedback or reset line is connected to the SET input of the monostable FF 158, in order to SET FF 158 into its astable switching state. Each clock pulse applied to counter 115 causes stepping of the counter by one count, that is, the output signal of the counter 115 jumps, in synchronism with the count pulses from one count stage output to the next, where it remains until the next clock pulse is applied. In the example illustrated, any one operating switch 123 is associated with any counter output stage. Each counter output stage is connected to a switching output terminal 120. The coding for selective control of the loads 122, in the example, merely requires associating the appropriate operating switch 123 to the respective count output terminal of the counter 115. The other terminals of the switches 123 are then connected to the inputs of an OR-gate 119, to a wave-shaping stage 128 which, simply, is a synchronizing AND-gate, and are then connected to the control bus 129. The diagram illustrated in FIGS. 1 and 2 shows that the operating switch 123.4 is closed, to select the receiver 111.4, to operate the load 122.4. The fourth clock pulse in the cycle which started after the control pulse — defined by a pause in the pulse sequence — applied to the counter circuit 115 causes an output to appear at the bus 129, which will be maintained thereon until the fifth clock pulse occurs. The fourth output stage, connected to the fourth output terminal, will be connected over the fourth, closed operating switch 123.4 so that a control pulse will appear on bus 129 in synchronism with the fourth clock pulse of the respective selection cycle. The coincidence of the control pulse and the fourth clock pulse is evaluated in the receivers, and only receiver 111.4 will respond, in order to control the load 122.4, as will be described.

The load 122.4, in the example, is of the type which provides a feedback or "acknowledge-executed" signal back to the central station 110. This type of load will apply an "acknowledge" pulse at the replyback line 145 during persistence of the fourth clock pulse on line 117 and, in this case, on bus 129, respectively. To provide an acknowledgment indication, the switches 123 are connected with the terminal remote from that connected to terminals 120 to a replyback comparator stage 144. The comparator stage 144 has a group of three-terminal AND-gates 121 contained therein, one terminal of which is connected to the respective switches 123. A second input of all the AND-gates 121 is connected to the replyback line 145. The AND-gates all have their third inputs connected to the clock pulse line which supplies the clock pulses to bus 117, in this case to the input of counter 115. The AND-gates are thus activated only during the time of a respective clock pulse, thus eliminating application of stray pulses which might cause spurious response.

Operation of the acknowledgment indicator 148: During persistence of a pulse at the fourth output stage of the counter 115, closed condition of the operating switch 123.4, and presence of an acknowledgment pulse on bus 145, the coincidence requirements of the AND-gate 121.4 are satisfied and a signal will be applied to the indicator 148.4. The indicator, which may, for example, be a light indicator, an acoustic signal, or the like, will provide a predetermined information content to the operator of the vehicle who operated switch 123.4. A suitable indicator may, for example, be a liquid crystal, or light-emitting diode (LED) display element which may have a predetermined persistence time and then fade out; if desired, it may have self-holding properties to remain operated, even upon subsequent opening of the switch 123.4, to be extinguished only upon subsequent operation of the switch 123.4.

The receiver 111 and load 122 selectively controlled by the central station 110 are shown in detail in FIG. 3, illustrating a type of load which has an acknowledgment replyback transmitter.

The receiver includes a receiver counter 130 connected to the bus system 106. The counter 130 counts the clock pulses of the selection cycles after any one control pulse, similar to the counting by counter 115 in the central station 110. The counters 130 in the receivers are reset into their base state at the beginning of each selection cycle, so that the remote control system is effectively re-synchronized at any one selection cycle. The control signal, if of the type forming a pulse gap in the recurring cyclical rate, of a predetermined time duration, is sensed by a control signal sensor or discriminator circuit 156.

The control signal sensor circuit 156 is a timing circuit which has a fixed timing duration set for a duration which is between the length of a control pulse and the length of a clock pulse. In a preferred form, the timing circuit is a monostable FF 159 which is so arranged that each SET signal which is applied at the SET input thereof starts a new astable timing period, whether the SET signal occurs before or after the duration Resetting into the stable switching state, thereof, can occur only when, at least during the time duration which is determined by the circuit parameters of the FF 159, no new SET signal appears at the SET input. In the embodiment described, this can occur only if there is a pause in clock pulses, that is, in case of the presence of a control pulse on the clock bus 117. Upon resetting into stable state, the counter 130 is reset to the zero state by the FF 159; the first clock pulse is then transmitted through the FF 159 from bus 117 to counter 130, as is each subsequent clock pulse which always causes resetting operation of the FF 159, thus stepping the counter 130.

All the receivers 111 connected to the bus system 106 will include this combination of control pulse sensor 156 and counter 130, so that all receiver counters 130 will count in synchronism with the pulses of the selection cycle also being counted in counter 115 in the central station 110.

The receivers 111 are coded so that only those receivers will respond which are commanded to respond by operation of the respective operating switch 123 in the central station 110. To effect decoding of the signals on buses 129, each receiver 111 is provided with a decoding circuit 131 which applies an output signal if and only if coincidence between the count state associated with any specific operating switch 123, connected to counter 115 in the central station 110 and occurrence of a switching pulse in the control line 129 occurs, to which also the count state at the output terminals of the receiver counter 130 corresponds. This condition of coincidence is decoded by a coincidence stage 135, in its simplest form an AND-gate, which is connected to the output of the respective receiver 111, and which operates the load 122 connected to the respective receiver 111 and selected by the central station 110.

The receiver 111.4 shown in FIG. 3 is associated with the fourth operating switch 123.4. The decoding circuit 131 of the receiver 111.4 then must be connected to the fourth count output stage of the receiver counter 130 before, or upon connection of the receiver to the bus system 106. The connection can be effected by various ways, for example by soldering an electrical connection, by making, originally, electrical connections from all the output stages of counter 130 and then interrupting those not necessary for the particular coding, or the like; in some applications it may be desirable to effect the connection by plug bridges, or by transfer switches, so that the receiver 111 can be switched or re-programmed, to be operated by other operating switches 123 than the one originally selected. An additional connection may be provided for manual override, and manual connection to the power bus 114, for example to permit operation under emergency conditions.

More than one receiver 111 can be controlled by any one operating switch 123; the various receivers 111 may be located at various desired positions of the bus system 106. It is only necessary to provide the various receivers with the same setting of the decoding circuit 131.

Any one particular receiver can also respond to operation of more than one operating switch 123, it is only necessary to provide a plurality of corresponding connections in the decoding circuit 131. If this is desired, then a buffer or decoupling gate, such as an OR-gate, should be provided between the various connections of the decoding circuit 131 and the AND-gate 135 to prevent spurious connections, and mutual influencing of other circuits.

The specific load 122 connected to the coincidence AND-gate 135 may, for example, be the combination of an operating element, such as a switch, a timing switch, an amplifier or the like and an additional final operating load connected to the power bus 114. This load may, for example, be the motor to operate windshield wipers, window motors, headlights, or any other power-consuming load; they may, also be signalling elements such as signal lamps, the horn, or the like; or the load may be a measuring or supervisory or indicator apparatus, for example for fuel supply, oil pressure, cooling water temperature, or the like of an automotive vehicle.

The reply-back or answer-back signal source 149 can be any signal transmitter or signal source which provides a signal when certain conditions occur, for example when certain parameters or sensed conditions exceed a threshold value. Signal source 149 may, therefore, be a threshold switch which provides a signal over the feedback bus 145 of the bus system 106 to the central station 110 so that the indicator 148 in the central station 110 will be suitably controlled thereby. The indicator 148 (FIGS. 1, 2) in the central station 110 then will be an ON-OFF indicator, such as an indicator lamp which is either extinguished or lit; or a relay circuit which changes state when the reply-back bus 145 is energized, and causes further switching functions to be initiated, or a "sample-and hold" circuit for analog output.

The operating switches 123 are primarily intended for operation by the operator of the automotive vehicle in which the remote control system is contained; the switches are intended for operation of such loads as signalling devices, illumination at selected points, headlights, or positioning motors, such as servo motors. Others of the operating switches 123 may be replaced by transducers which are not operated by the vehicle operator himself, but rather are controlled directly by operating conditions or parameters arising in the vehicle, for example for control or supervision of engine condition and operation and operating parameters. They may operate in accordance with automatic devices, sequentially energized, for example, in accordance with automatic sequencing. The sequencing itself can be arranged in a suitable program to cause particular functions and operations to occur at predetermined elements or components of the automatic vehicle or its engine, or to interrogate transducer measuring specific conditions. For example, one of the switches 123 may be closed, in accordance with a predetermined program, once for each operating cycle to connect an oil pressure transducer to the circuit and to provide a feedback signal over bus 145 to an oil pressure indicator. If the oil pressure is above the design limit, no warning indication is given; should the oil pressure drop, however, below its predetermined threshold value, a warning of lack of lubrication is provided at the appropriate indicator to the operator of the vehicle.

If the respective switch 123 is manually controlled by the operator of the vehicle then, due to the high repetition rate of operating cycles, the operating switch 123 will be closed for the entire operating cycle. Thus, when the output signal of the counter 115, which is associated with the respective switch 123, occurs a switching pulse associated with the particular number of the switch will be reliably provided to the control bus 129 of the bus system 106. If the respective switch 123 is electronically controlled, for example over a contactless transducer, or in accordance with the aforementioned automatic sequencing or program, then coincidence of operation of the respective switch 123 and occurrence of the number associated therewith in the counter 115 is not necessarily ensured.

Figure 6:
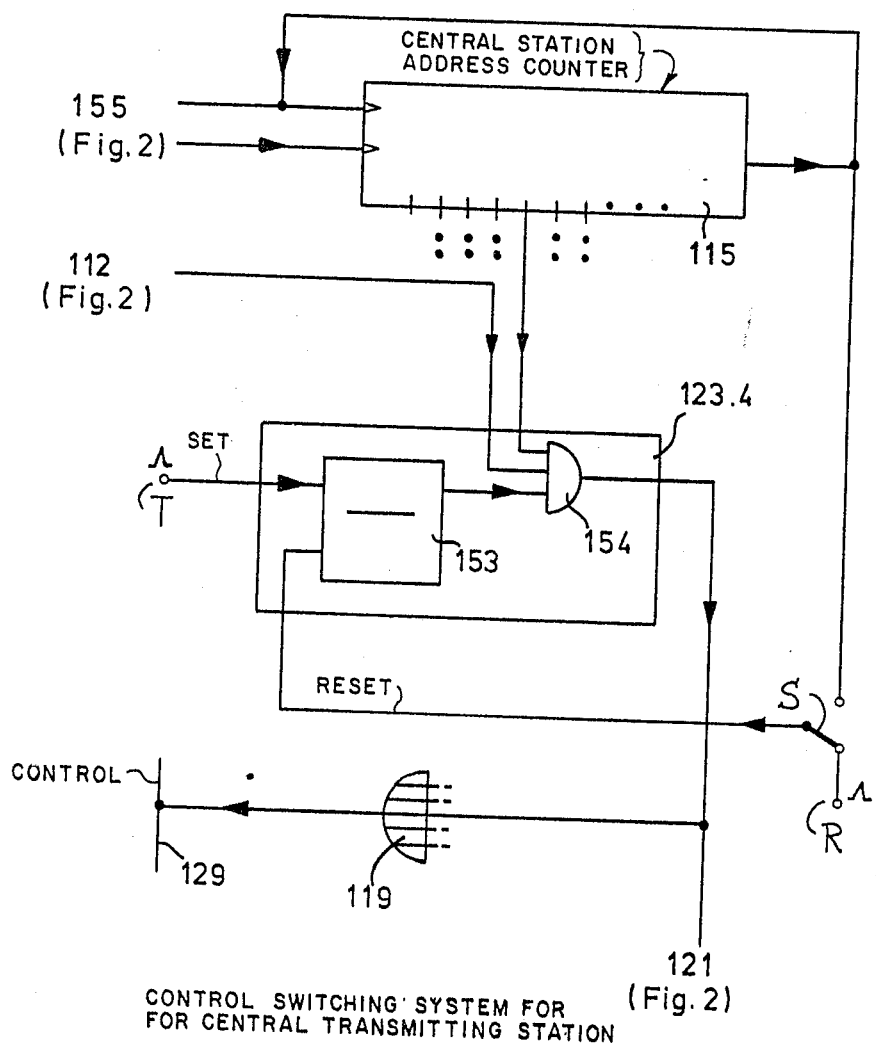
FIG. 6 is a schematic block diagram of a control switching arrangement for the central transmitter stations of FIG. 2, or FIG. 4, respectively, using pushbutton control.

FIG. 6 is a fragmentary schematic block diagram which ensures that any operating switch 123 will be energized for a period of time sufficient to permit selection of the associated function under all conditions. Switch 123 itself includes a bistable FF 153 and an AND-gate 154 connected to the output of FF 153. AND-gate 154 has three inputs, one derived from the count output of the counter 115, and a further input derived from the pulse generator 112 (FIG. 2). The AND-gate 154 also carries out the function of the wave-shaping or pulse-shaping stage 128 (FIG. 2). A pulse applied at terminal T, which may be derived from a manual switch or from an automatic electronic transducer scanned in accordance with a program, sets the FF 153. This provides an output at one of the inputs of the AND-gate 154. The second input of AND-gate 154 is constantly pulsed by the pulse generator 112; when the third input of the AND-gate 154 is energized from the fourth count stage of counter 115 (again selecting the example of the fourth count stage being the closed switch), an output will be applied to the OR-gate 119 and hence to the control bus 129 due to coincidence of the count pulse, the clock pulse, and the set condition of the FF 153. The bistable FF 153 can be reset either at the initiation of the next selection cycle by, for example, connecting the reset terminal R to the reset or highest count stage of counter 115. Alternatively, a switch S can be connected to another control circuit which provides a reset pulse. If the switch S is set in the position shown, an outside reset pulse applied to terminal R will reset FF 153. The FF 153 preferably is constructed, however, as a so-called trigger-FF, that is, resetting of FF 153 is effected by a second pulse applied to the terminal T, with the reset line being omitted. FF 153 may also be constructed as a monostable FF triggered by a SET pulse from terminal T and remaining in its unstable state for the time duration of one complete operating cycle, plus the length of the control pulse, that is, for the time period required for the counter 115 to reach a given count state in the subsequent operating cycle.

The remote control system can readily be constructed by assembling standard digital modules, and provides a reliable system. In case of malfunction it is easily checked and repaired since the electronic components are concentrated in the central station 110, or in the receivers 111, respectively. For purposes of illustration of the preferred embodiment, and for ease of explanation, the basic functions of the digital components, and particularly the logical interconnections will be easily understood AND-gates and OR-gates. In actual practice, and in order to provide reliability and unambiguous operation in the possible presence of noise signals, it is preferred to operate the system not with passive elements, but rather with active gates, that is, with modules having N . . . functional construction. Buffers and other elements for dynamic suppression of noise and interference, and amplifiers to transmit pulses through the bus system 106, as well as pre-amplifiers connected in advance of the loads 122, have been left off the drawings, and have not been specifically explained since their connection is self-evident. The use and extent of use of such components will depend on the extent and complexity of the overall system.

The bus system 106 may be a ring bus system, as customary in many remote control systems. Such a bus system is a single bundle of a group of a few conductors, passing all physical positions at which a receiver is to be placed, or the central station is to be located. The particular location of the central station, or of the receivers, with respect to each other along this bus system is irrelevant. The bus system need not, actually, be a closed loop; the only requirement is that a closed circuit can be established from the central station to all the receivers, so that the receivers can be selectively controlled.

By raising the pulse frequency at the output of the pulse generator 112, a large number of loads can be controlled, since the selection or control cycle can be extremely short. Delays in response of the loads after operation of a respective switch 123, which is irritating to the operator, are thereby effectively avoided. The components required both for the central station 110 as well as for the receivers 111, and for the loads 122 are a minimum; yet, the coding of the system permits reliable distinction in response between the respective receivers. During any one selection cycle, a random and desired number of loads can be selected by operating the respective operating switch, so that no priority control is necessary, since blocking of any loads which are not selected during any particular selection cycle cannot occur in this system.

The present invention permits a completely new wiring scheme which radially departs from the conventional wiring harnesses and wiring arrangements customary in automotive technology. The operating switches 123 are all located in the central station 110. These switches may be manual, operator-controlled, or may be other switches, mechanical or semi-conductor relays which are, themselves, controlled by transducers. By combining all these operating switches at the central station, a simple, easily defined addressing of the loads is possible, by merely allocating number positions within a pulse sequence, that is, within a cycle of pulses occurring after a control pulse. This permits simplification of decoding in the receivers, and, if with such simple decoding, permits versatile application of a remote control system which can easily be matched to specific requirements and can readily be expanded if, in specific applications, a greater number of loads is to be controlled. Combining all operating switches in the central station has been found not to be an undesirable limitation since in motor vehicles, and particularly in automotive vehicles, the vast majority of all operating elements is located in the vicinity of the steering wheel thereof, and therefore is already concentrated at a particular location in the vehicle. It is therefore not necessary to provide special elements to interrogate the condition of operating switches by means of special receivers in the bus system. Basically, the system does not require transmission of information regarding the type of function and operation executed by the load.

The acknowledgement reply-back information, or data derived from measuring or supervisory apparatus, uses a reply-back transmitter 149, connected to the reply-back bus 145 of the bus system 106. The acknowledgment information may indicate, for example, operation of a load, or readiness of operation of a load and, particularly, is a "YES-NO" signal. To ensure that the information is applied only over the operating switch 123 which is operated at any one instant of time, so that only the appropriate indicator 148 (FIGS. 1, 2) will respond, a reply-back block circuit 146, in its simplest form an AND-gate, is connected between the reply-back transmitter or sensor 149 and the reply-back bus 145. The inputs of the blocking AND gate are connected to the output of the coincidence AND gate 135 and to the output of the feedback signal generator or feedback signal supply element 149.

A feedback signal generator or supply element 149 may, for example, be a photosensitive receiver, such as a photocell, or phototransistor which, when illuminated, provides an output signal and thus transmits over the feedback bus 145 an indication to the associated indicator 148 in the receiver 111 of the central station 110 (FIG. 2) where, for example, illumination of an indicator lamp shows that a lamp, associated with the appropriate load 122, is operating.

The actual operating apparatus or device of the load 122 is preferably so arranged that it operates for a period of time corresponding, approximately, to the time duration of a selection cycle, so that the load will remain connected, upon operation of the associated operating switch 123, for the time duration of a complete selection cycle, including the control pulse, and will be disconnected only during a subsequent selection cycle if, at that time, the operating switch 123 is no longer operated.

A large number of independently controllable loads 123 require a substantial number of individual count positions which the counter 115 can assume. Counters with high count numbers are, however, expensive, and the costs of registers and counters rapidly rises if any one count state, directly, is associated with a certain operating switch. In accordance with the further embodiment of the invention, therefore, the counter 115' (FIG. 4) is constructed as a binary coded counter 124, which is controlled over a decoding matrix 125 from the operating switches 123. FIG. 4, as the previous figures, only shows five count stages, for simplicity, although this embodiment is particularly applicable for high count numbers.

The decoding matrix 125, preferably, is a diode matrix, connected at the transmitter side and controlled by the switches 123. The operating line pairs of the decoding matrix 125 are connected over a matching stage 126 having direct and inverse signal terminals to the binary stage output of the binary coded counter 124. The interconnection between the terminals associated with the respective operating switches 123 on the one hand, and the operating line pairs of the matrix on the other is effected by means of diodes 141, 142, in well known manner; diodes 141, 142 decouple the operating switches 123 from each other and prevent spurious feedback in case of multiple operation of several of the operating switches. Only the diode connections which are associated with switch 123.4 are shown in FIG. 4, for simplicity; the other diode connections are merely illustrated by small circles in the drawings. The states of the operating line pairs and the stage 126 is also indicated for the fourth count state of the binary coded counter 124, in binary notation.

Operation, with reference to FIG. 4: Upon closing of the switch 123.4, all diodes 141 will be biased in blocking condition when the counter has reached a fourth counting state within any one selection cycle; those are the diodes connected to the fourth control line, so that, with the operating switch 123.4 being closed, a positivie voltage is applied to the control bus 129, which correspondes to the number 4 (see the diagram 1.2 of FIG. 1).

The binary coded counter 124, in combination with the decoding matrix 125, used as the counter 115 in a central station 110 results in substantial reduction in circuit components when a feedback indication is also desired. The function of the feedback comparator 144 (FIG. 2) can be carried out by the decoupling diodes 142, connected in the control lines between the operating switches 123 and the connecting diodes 141; overall, the diodes 142 correspond, in operation, to the OR gate 119 (FIG. 2).

Figure 5:
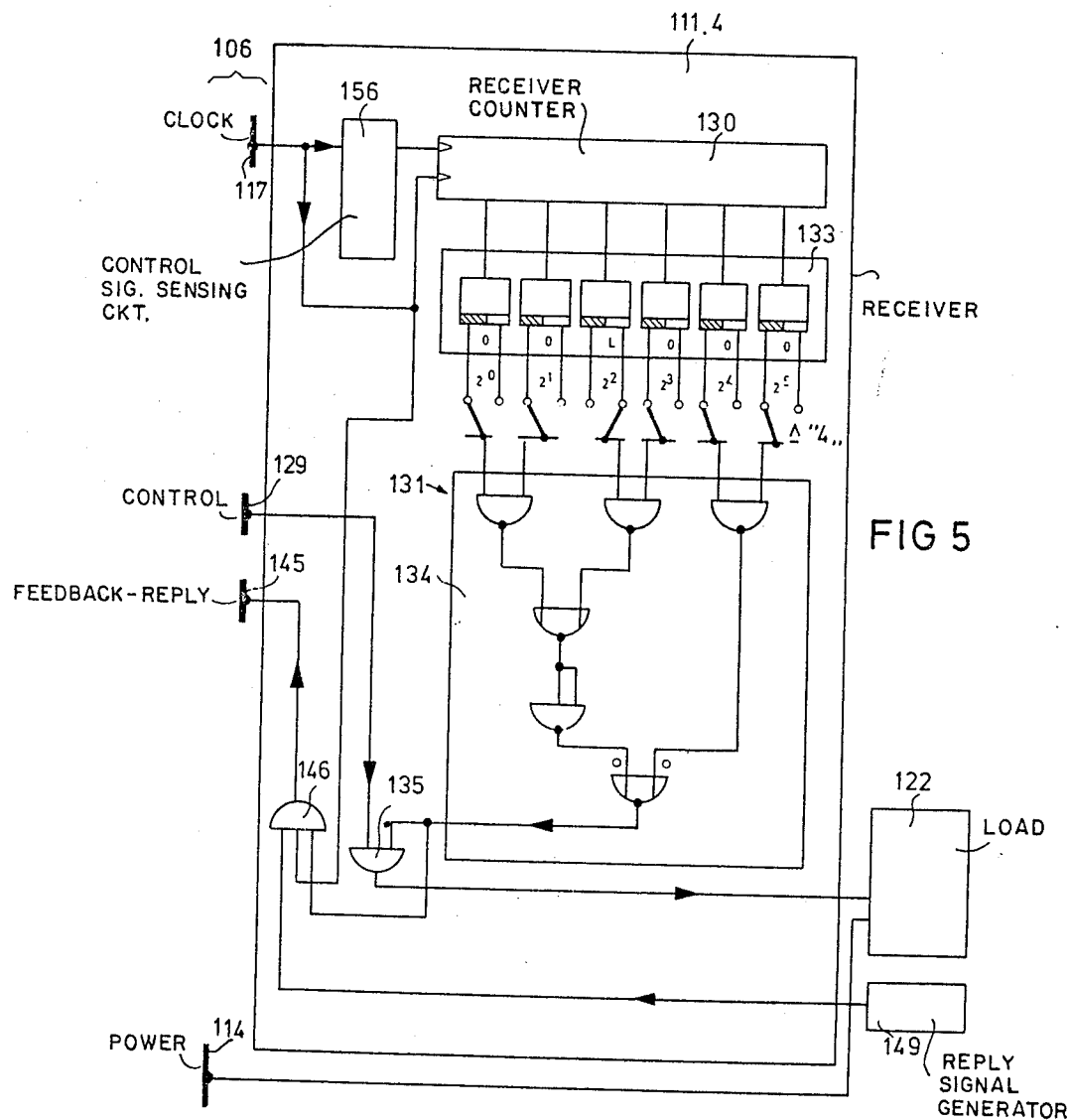
FIG. 5 is a schematic diagram of a receiver particularly useful when a large number of receivers are to be connected to a central station, for example for use with the transmitter of FIG. 4.

FIG. 5 illustrates the preferred embodiment for a receiver matched to a central station including the matrix 115' of FIG. 4. The central station 110, as before, controls the receivers 111 over the clock bus 117 to step a receiver counter 130. Receiving counter 130 also supplies binary coded count output signals. The binary coded receiving counter 130 is connected, at the receiver, to a decoding circuit 131 over the decoding stage 133, one for each binary position. An interrogating gate 134 is connected to the counter 130. Its function corresponds to the decoding matrix 125 in the embodiment of FIG. 4. The decoding circuit 131 can be realized in simpler, easier way, namely by making a prewired combination of AND and OR gates, since it is no longer necessary to provide for selective operation thereof, as in the central station. In the central station, selective operation is required since the user may operate any one of, or more, of the switches 123; in the receiver, it is not necessary to provide circuitry to interrogate all count stages of the count pulses emitted during any one selection cycle; the receiver requires recognition of only a single count number, or count state associated with a specific receiver during any one selection cycle; some receivers, of course, may respond to more than one count state.

The receivers 111 are preferably made as universally applicable modules, which can be inexpensively made in mass production processes. In order to permit mass production manufacture, and in accordance with the embodiment of FIG. 5, the decoding circuit 131' should first have the outputs of the decoding stage 133 connected thereto in accordance with any suitable manufacturing arrangement. The specific connection of the decoding gate 134 to stage 133 is then made by connecting bridges, or by interrupting previously made connections so that a predetermined count number will be decoded by stage 134, matched to the count number determined by the specific operating switch 123 connected to the central station 110. The receiver 111 is then connected in parallel to other receivers 111 to the bus system 106 and hence to the central station 110 at any desired location.

Operation, with reference to FIG. 5: Count number 4 is to be selected, that is, the count associated with operation of operating switch 123.4, as shown in FIG. 5. After the control pulse, the clock pulses on bus 117 will cause the receiving counter 130 to step, in binary coded sequence, until it reaches the count state L00 (decimal:4). The binary coded count is decoded in stage 133, and at the output of the interrogation gate 134, that is, at the output of the receiver decoding circuit 131', a signal will appear which is applied to the coincidence gate 135. As explained in connection with FIGS. 1, 2 and 3, the coincidence conditions are satisfied if, at the same time, switch 123.4 in the central station 110 is operated so that a pulse will synchronously appear on the control bus 129. The load 122, connected to the gate 135 will thus be activated, as explained in detail in connection with FIG. 3. Simultaneously, the first input of the feedback gate 146 is activated so that upon appearance of a signal from the sensor 149 a feedback or acknowledgement pulse can be applied to feedback line 145 to be transmitted to central station 110.

The embodiment of FIG. 5 illustrates a feedback gate 146' which has a third input, connected to the clock bus 117. The third input insures that the feedback pulse occurs only in coincidence with the associated clock pulse. The feedback pulse is interrupted before the next clock pulse appears, causing also transistion of the receiver counter 130 to the next count stage, so that the specific receiver 111.4 is no longer activated during the then present selection cycle. In actual practice switching delays and signal degradation will occur if a plurality of gates are connected to the network; it is, therefore, desirable to force strict synchronization between the count stages at the output of the counter 115 of the transmitter or central station 110 and of the feedback pulses derived from the various receivers. This forced synchronization then insures that the feedback pulse is interrupted upon termination of the associated clock pulse, by blocking the gate 146 as soon as the respective clock pulse, occurring synchronously with the control pulse, also terminates.

Each load is selectively controlled by its own receiver, so that only the function and operation allocated to the specific load will be controlled and selected. Nevertheless, the system readily permits indication of conditions occurring in the vehicle, and execution of functions commanded by operating the switches 123. Such indications are partly mandated by motor vehicle registration regulations, and partly required for the comfort and safety of the operator. The system is readily adapted to provide such supervisory indication functions on the bus 145, connected to the indicators 148 (FIGS. 1, 2) thus providing information that commanded operations, or commanded measurements have been carried out, and an output that the measurements fall above or below the predetermined threshold value.

A suitable clock rate for clock generator 112, in a passenger automotive system is 4,500 Hz, with a control pulse (or, rather, pulse gap) of 7 cycles, the number of selectively switchable loads being 63.

Various changes and modifications may be made within the scope of the inventive concept.

If an analogue output is desired, such as, for example, the quantity of fuel in a fuel tank, the fuel tank gauge can be interrogated at each interrogation cycle, with a counter associated with the fuel gauge itself counting the number of interrogation pulses. The outputs of the counter themselves are controlled by the level of fuel in the tank; for example, if the tank is full, the counter may count through to 15 (which is a simple count on a binary coded counter), but, if the tank is only half full, the counter will count only to seven. The indicator for the fuel then can totalize the number of feedback pulses through 16 interrogation, or control cycles, and thereby, can readily provide an analogue output, indicative for example of the charge on a capacitor, which is charged by each return pulse from the fuel sensor and will hold the charge at the last pulse until discharged at each fifteenth counting, or controlled cycle.

The reply or answer back indicators 148 need not only be visual, or aural indicators, but may, broadly, be sensors responsive to sensing that a reply-back or answer-back signal has been received, and, acting on this received information, itself initiating further automatic control functions.

We claim:

1. Remote control system for selection of at least one of a plurality of selectively switchable loads (122) from a central station (110) comprising
   a plurality of selectively operable load control switch means (123) to selectively address selected loads and command occurrence of a switching function;
   a bus system (106) connected to said central station (110) having a power bus (114), a clock bus (117), a load switching control bus (129), and a load acknowledge feedback and reply bus (145);
   a plurality of load receivers (111) connected to respective loads (122) and to the bus system (106) to effect selectively connection of selected loads to the power bus (106) when connection is selectively commanded by said load switch means, wherein
   the central station (110) comprises signal generator means (112, 155) connected to the clock bus (117) of the bus system (106) and providing
   (a) a group sequence or cycle of clock pulses collectively forming a selection cycle, and
   (b) a control signal separating the selection cycles and having a characteristic different from the clock pulses of the selection cycles;
   switching control means (115) connected to and controlled by said switch means (123) selecting and segregating at least one specific pulse within the selection cycle, as determined by the setting of the switch means (123) and applying said at least one selected specific pulse to the switching control bus (129);
   and load acknowledge decoding means (144);
   and wherein said receivers (111) each comprise
   a receiver counter (130) connected to the clock bus (117) of the bus system (106) and stepping in synchronism with the clock pulses in the selection cycles to progressively count the pulses within a selection cycle;
   a decoding circuit (131, 135) connected to the receiver counter (130), the decoding circuit being connected to recognize selected count states or numbers of the receiver counter (130), which selected counter states or numbers are associated with predetermined ones of the receivers and if, and only if, there is coincidence between said selected count of the receiver counter (130) stepping in synchronism with the clock pulses during a selection cycle, and occurrence of a signal on the load switching control bus (129), as applied by said switching control means (123), causing a switching function of the respective switchable load to occur;
   electrical reply signal generator means (149) generating a signal to be indicative of response by the respective load to the commanded switching function;
   and a reply transmitting logic means (146) connected to the reply bus (145) and to the reply signal generating means (149) providing and applying a switching function acknowledgment signal to said load acknowledge feedback and reply bus (145) synchronously with the occurrence of said at least one respective specific pulse;
   and wherein the load acknowledge decoding means (144) of the central station (110) includes coincidence means (121) connected to and controlled by the load acknowledge feedback and reply bus (145) and further connected to and controlled by the switching control means (115) and said load control switch means (123) to be energized by said at least one specific selected pulse from said load switching control means (123) as determined by the setting of the load control switch means (123), said load acknowledge decoding means (144) providing an acknowledgment indication output simultaneously with at least one selected clock pulse of the respective selection cycle;
   and reply sensing means (148) connected to and controlled by said load acknowledge decoding means (144) and responsive to the acknowledgment indication output to sense that an addressed load has responded by carrying out said commanded switching function.

2. System according to claim 1 wherein the decoding circuit (131, 135) of the receiver counter (130) is a selectively programmable decoding stage to be selectively associated with any one count number or counting stage of the receiving counter (130).

3. System according to claim 1, wherein the signal generator means of the central station (110) comprises a clock generator (112) and a control signal generating circuit (155), the control signal generating circuit being connected to the output of the central counter (115) and generating the control signal separating the selection cycles upon the termination of count of the counter.

4. System according to claim 3, wherein the control signal generating circuit (155) comprises a timing circuit changing the pulse repetition duration to differ from the clock pulse rate of pulses during the selection cycle whereby the different characteristics of the control signal will be a change in the pulse repetition rate of the clock pulses.

5. System according to claim 3, wherein the control signal generating circuit (155) comprises a timing circuit (158) extending the recurrence of a clock pulse applied to the control bus (117) to a period at least as long as the overall duration of a complete clock pulse and a clock pulse gap, whereby the different characteristic will be an extended pulse gap occurring between selection cycles.

6. System according to claim 1, further comprising control signal detector means (156) included in each of said receivers (111), said control signal detector means being responsive to the difference in characteristics between said control signal and the clock pulses occurring during the selection cycle, the control signal detector means being connected to the clock bus (117) and to the receiver counter (130) and controlling restarting of the counter (130) on sensing of a control signal.

7. System according to claim 6, wherein the control signal detector means (156) includes a timing circuit (159), and said different characteristics comprises a pulse having a time duration substantially different from the pulse length of the clock pulses occurring during the selection cycles, said timing circuit being responsive to said difference in time.

8. System according to claim 5, further comprising a receiver timing circuit (159) included in each of said receivers (111) and responsive to the extended pulse gaps between clock pulses separating selection cycles, the timing circuit being connected to the clock bus (117) and to the receiver counter (130) and controlling restarting of the counter (130) on sensing of an extended pulse gap.

9. System according to claim 1, wherein at least one of said counters (115, 130) comprising a ring counter.

10. System according to claim 1, wherein the control switch means comprises switch means connected to each count stage of the counter (115) and the connection circuit connects all said switch means to the control bus (129) to connect those pulses to the control bus at a time, as counted by the counter, which correspond to closed switches (123) between the output stages (120) of the counter and the control bus (129);

and wherein the decoding circuit (131) of the receivers each comprises a coincidence stage (135) forming a selectively settable electrical connection between at least one of the count output stages of the receiver counter (130) and the control bus (129) to provide an output if, and only if, coincidence between the selected count of the receiver counter and the pulse on the control bus occurs.

11. System according to claim 1, wherein the counter (115) of the central station (110) and the counters (130) of the receivers (111) comprises binary coded counters (124).

12. System according to claim 11 wherein (FIG. 4) the central counter (115') includes a decoding matrix (125) connected to the operating switch means (123).

13. System according to claim 11 wherein (FIG. 5) the receiving counter includes a decoding gate circuit (134) forming the decoding circuit (131') and connected to the receiving counter (130), said decoding gate circuit being logically connectable to decode binary coded decimal outputs of the receiver counter.

14. System according to claim 1, wherein the reply transmitting logic means (146) comprises a coincidence stage (146) blocking connection of the reply signal generating means (149) to the reply bus (145) unless the decoding circuit (131, 135) has recognized said selected count state or number.

15. System according to claim 1, wherein the reply transmitting logic means includes a connection to the clock bus (117) to synchronize transmission of the reply signal generated by the reply signal generating means with the clock pulse during the respective selection cycle count associated with a the specific receiver.

16. System according to claim 1, wherein (FIG. 6) at least one of the operating switches (123) comprises a pulse control flip-flop (FF) (153) and an AND-gate (154) a further input of the AND-gate (154) being connected to the respective output of the counter (115) associated with the particular switch of the switch means and forming one input of the switch, the output of the AND-gate forming the output of the switch.

17. System according to claim 16, wherein the flip-flop (FF) (153) is a bi-stable flip-flop and has a reset input connected to the full-count, or overflow output of the counter (115).

18. System according to claim 16, wherein the flip-flop (FF) (153) is a bi-stable flip-flop (153) and a separate reset pulse source (R) is provided to reset the flip-flop (153).

19. System according to claim 16, wherein the flip-flop (153) is a trigger-type flip-flop alternately setting, and resetting upon application of sequential pulses thereto.

20. In an automotive vehicle, an electrical distribution and control system comprising the remote control system of claim 1, wherein the power bus (114) has substantially higher current carrying capacity than the clock bus, the control bus, and the reply bus, respectively, the loads being connected to the power bus;

and wherein the bus system comprises a plurality of parallel buses joined to form a single cable passing adjacent at least a major portion of the loads.

21. In a vehicle, a combined on-board remote control, energy supply and signaling system comprising the system of claim 1, wherein the power bus (114) has substantially higher current carrying capacity than the clock bus (117), the control bus (129) and the reply bus (145), respectively; and all said buses are combined in a common cable located to pass adajcent the loads, and the central station as positioned on board of the vehicle.

22. System according to claim 1, wherein the switching control means includes a central counter (115) stepping in synchronism with the clock pulses of each selection cycle; and a connection circuit (119) connected to the load switching control bus (129) and to the central counter (115) via said selectively operable control switch means (123) to connect selected counts from the output (120) of the counter within a selection cycle to the load switching control bus (129) in accordance with the setting of the control switch means.

23. In and for combination with a remote control system for selective control of a plurality of switchable loads (122) from a central station (110) having a plurality of selectively operable control switch means (123) to selectively address selected loads; and a bus system (106) having a power bus (114), a clock bus (117), a control bus (129) and a reply bus (145);

a central station comprising signal generator means (112, 155) providing
(a) a grouped sequence or cycle of clock pulses collectively forming a selection cycle and
(b) a control signal separating the selection cycles and having a characteristic different from the clock pulses in the selection cycles, the signal generator means being connected to the clock bus (117) of the bus system (106);

a central counter (115) counting the clock pulses of each selection cycle and stepping in synchronism therewith;

a connection circuit (119) connected to the control bus (129);

the control switch means (123) being connected to the central counter (115) and selectively operable to connect selected counts from the output (120) of the counter within a selection cycle to the connection circuit (119) and hence to the control bus (129) in accordance with the setting of the control switch means (123);

and reply control circuit means (144) including coincidence means (121) connected to the reply bus (145) and further to the control switch means (123) and hence through said control switch means to the central counter (115) to effect selective connection of the selected counts of the counter (115) in accordance with the setting of the control switch means (123), and of the reply bus (145) to the coincidence means;

the coincidence means, upon simultaneous sensing of occurrence of a pulse from the central counter (115) and a pulse from the reply bus (145) providing an "acknowledge" output;

and a plurality of reply indicating means (148) respectively associated with selected receivers connected to respective coincidence means and indicating that the selected load has been addressed.

24. In and for combination with a remote control system for selective control of a plurality of switchable loads (122) from a central station (110) having a plurality of selectively operable control switch means (123) to selectively address selected loads; and a bus system (106) having a power bus (114), a clock bus (117), a control bus (129) and a reply bus (145);

a receiver comprising a receiver counter (130) connected to the clock bus (117) of the bus system (106) and counting the clock pulses in the selection cycles, and stepping in synchronism therewith;

a decoding circuit (131, 135) connected to the control bus (129), to the receiver counter (130) and to the load (122), the decoding circuit being connected to recognize selected count states, or numbers, of the receiver counter (130), which selected count states or numbers are associated with predetermined ones of the receivers and, if, and only if, there is coincidence between said selected count of the receiver counter (130) stepping in synchronism with the clock pulses during a selection cycle, and occurrence of a signal on the control bus (129), causing a switching function of said switchable load to occur;

signal generator means (149) generating a signal to be transmitted to the reply sensing means (148) of the central station (110) and responsive to occurrence of said switching function;

and a reply transmitting coincidence logic means (146) having its output connected to the reply bus (145), and having its input connected to be controlled by the reply signal generating means (149) and by the decoding circuit (131, 135) to provide a reply output to the reply bus (145) synchronously with the count of the receiver counter (130) and hence with the clock pulses on the clock bus (117).

25. A central station according to claim 23, wherein the control signal generating circuit (155) comprises a timing circuit (158) extending the recurrence of a clock pulse applied to the control bus (117) to a period at least as long as the overall duration of a complete clock pulse and a clock pulse gap, whereby the difference characteristic will be an extended pulse gap occurring between selection cycles.

26. A receiver according to claim 24, further comprising a receiver timing circuit (159) included in each of said receivers (111) and responsive to an extended pulse gap between clock pulses separating selection cycles, the timing circuit being connected to the clock bus (117) and to the receiver counter (130) and controlling restarting of the counter (130) on sensing of a extended pulse gap.

* * * * *

UNITED STATES PATENT AND TRADEMARK OFFICE
CERTIFICATE OF CORRECTION

PATENT NO. : 4,085,403
DATED : April 18, 1978
INVENTOR(S) : Werner MEIER et al

It is certified that error appears in the above-identified patent and that said Letters Patent are hereby corrected as shown below:

Claim 1, column 16, line 17, before "selection" insert -- pulses of the --

Claim 1, column 16, line 18, change "salt" to -- said --

Signed and Sealed this

Tenth Day of October 1978

[SEAL]

Attest:

RUTH C. MASON
*Attesting Officer*

DONALD W. BANNER
*Commissioner of Patents and Trademarks*